(No Model.)

J. E. FOLK.
CENTRIFUGAL LIQUID SEPARATOR.

No. 488,672. Patented Dec. 27, 1892.

Witnesses:
Friedrich Gustav Wilhelm
Emil Neuhart

J. E. Folk  Inventor.
By Wilhelm & Bonner
Attorneys.

UNITED STATES PATENT OFFICE.

JESSE E. FOLK, OF BROOKLYN, NEW YORK, ASSIGNOR TO THE AKTIEBOLAGET SEPARATOR, OF STOCKHOLM, SWEDEN.

CENTRIFUGAL LIQUID SEPARATOR.

SPECIFICATION forming part of Letters Patent No. 488,672, dated December 27, 1892.

Application filed April 25, 1892. Serial No. 430,578. (No model.)

*To all whom it may concern:*

Be it known that I, JESSE E. FOLK, a citizen of the United States, residing at Brooklyn, in the county of Kings and State of New York, have invented new and useful Improvements in Centrifugal Liquid Separators, of which the following is a specification.

This invention relates to that class of centrifugal separators which are used for separating a compound liquid into its constituent liquids of different specific gravities, particularly for separating milk into cream and skim milk, and which are provided with division plates in the liquid space of the bowl whereby the liquid is divided into thin layers.

The object of my invention is to improve the arrangement of the division plates so as to render the same more efficient in use.

Figure 1:
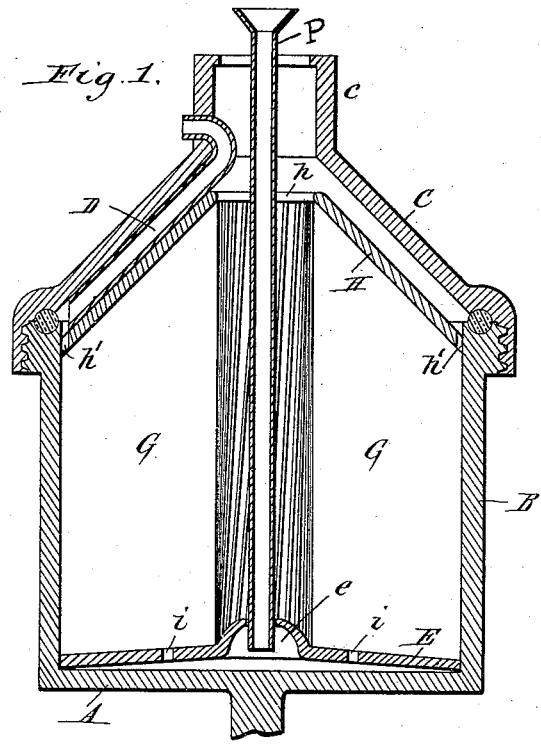
Figure 2:
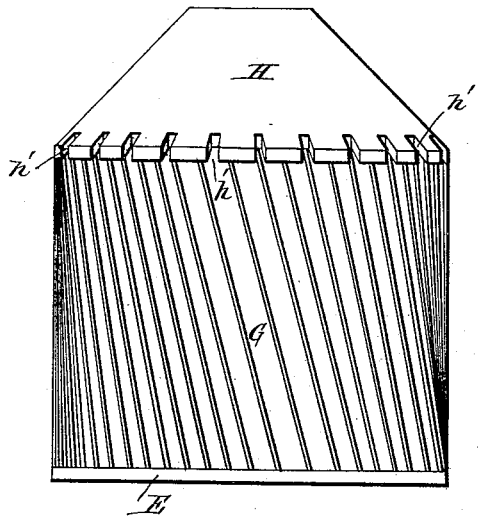
Figure 3:
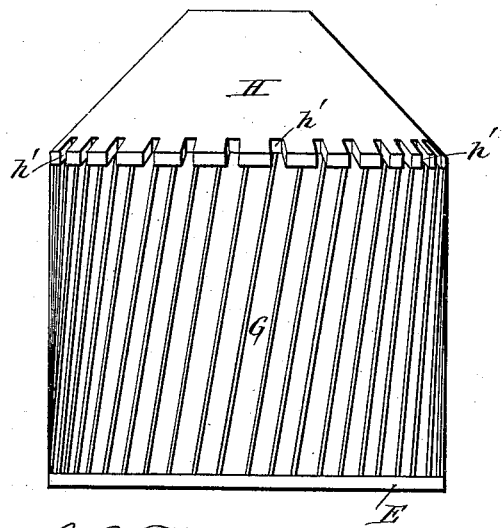

In the accompanying drawings:—Figure 1 is a vertical section of a centrifugal creamer provided with my improvements. Figs. 2 and 3 are elevations of the division plates removed from the bowl.

Like letters of reference refer to like parts in the several figures.

A represents the bottom of the bowl, B the peripheral or side wall thereof, and C the cover provided with a contracted neck c through which the separated liquids are discharged.

D represents one of the skim milk pipes which is secured to the underside of the cover and which opens with its lower end near the periphery of the bowl and penetrates the neck of the bowl with its upper end. Any other suitable devices may, however, be employed for discharging the separated liquids.

E represents a false bottom resting with its peripheral portion upon the bottom of the bowl and rising toward the center where it is provided with a raised feed cup e into which the full milk is delivered by a suitable feed pipe P.

G represents the division plates which are secured with their lower ends to the false bottom E and with their upper ends to an internal cover H which is arranged in the upper portion of the bowl underneath the skim milk pipe. This internal cover is provided at its apex with an opening h of about the same size as that of the contracted neck through which the cream passes to the neck, and in its peripheral edge with notches h' through which the skim milk passes to the skim milk pipe. The false bottom is provided between its inner and outer edges with a circular row of openings i through which the full milk passes into the narrow spaces between the division plates. The division plates are arranged radially, or nearly so, and are inclined with reference to the direction in which the bowl rotates, as clearly shown in Figs. 2 and 3. The continuous inflow of the milk at the bottom produces a pressure in the liquid which is exerted in a direction parallel with the axis of the bowl, and which manifests itself as a rising pressure when the bowl is arranged vertically with the inlet at the bottom and the discharge devices at the top. The inclined division plates intersect the direction in which the rising pressure operates and cause the rising pressure to assist in massing the particles of the same specific gravity on one side of each radial space between two division plates. I prefer to arrange the plates with their upper or delivery ends in advance of their lower or receiving ends in the direction in which the bowl rotates, as represented in Fig. 2, because in this arrangement of the plates, the rising pressure operates cumulatively with the centrifugal force in massing the heavy particles of skim milk in the rear portion of each radial space or against the rear plate of each space, and leaves the cream particles free to accumulate in the front portion of each space. Good results are, however, produced by the arrangement represented in Fig. 3, in which the plates are arranged with their lower ends in advance of their upper ends and in which the rising pressure acts principally to accelerate the movement of the cream particles in each space toward the front plate of the space and toward the top of the bowl. In either case the oblique or inclined arrangement of the plates, with reference to the direction in which the bowl rotates, causes the rising pressure, that is, the pressure which is exerted from the inlet toward the outlets of the bowl, to assist in massing the separated particles into well defined layers of separated liquids.

I do not wish to claim in this application the construction of the division contrivance consisting of the false bottom, the plates and the internal cover, because that subject matter is claimed in another application filed of even date herewith, Serial No. 430,576.

I claim as my invention:—

1. The combination with a separator bowl, of division plates arranged radially, or nearly so, in the liquid space of the bowl and inclined with reference to the direction in which the bowl rotates, substantially as set forth.

2. The combination with a separator bowl, of division plates arranged radially, or nearly so, in the liquid space of the bowl and having their delivery ends arranged in advance of their receiving ends in the direction in which the bowl rotates, substantially as set forth.

Witness my hand this 18th day of April, 1892.

JESSE E. FOLK.

Witnesses:
M. E. HATCH,
GEO. W. OAKLEY.